UNITED STATES PATENT OFFICE.

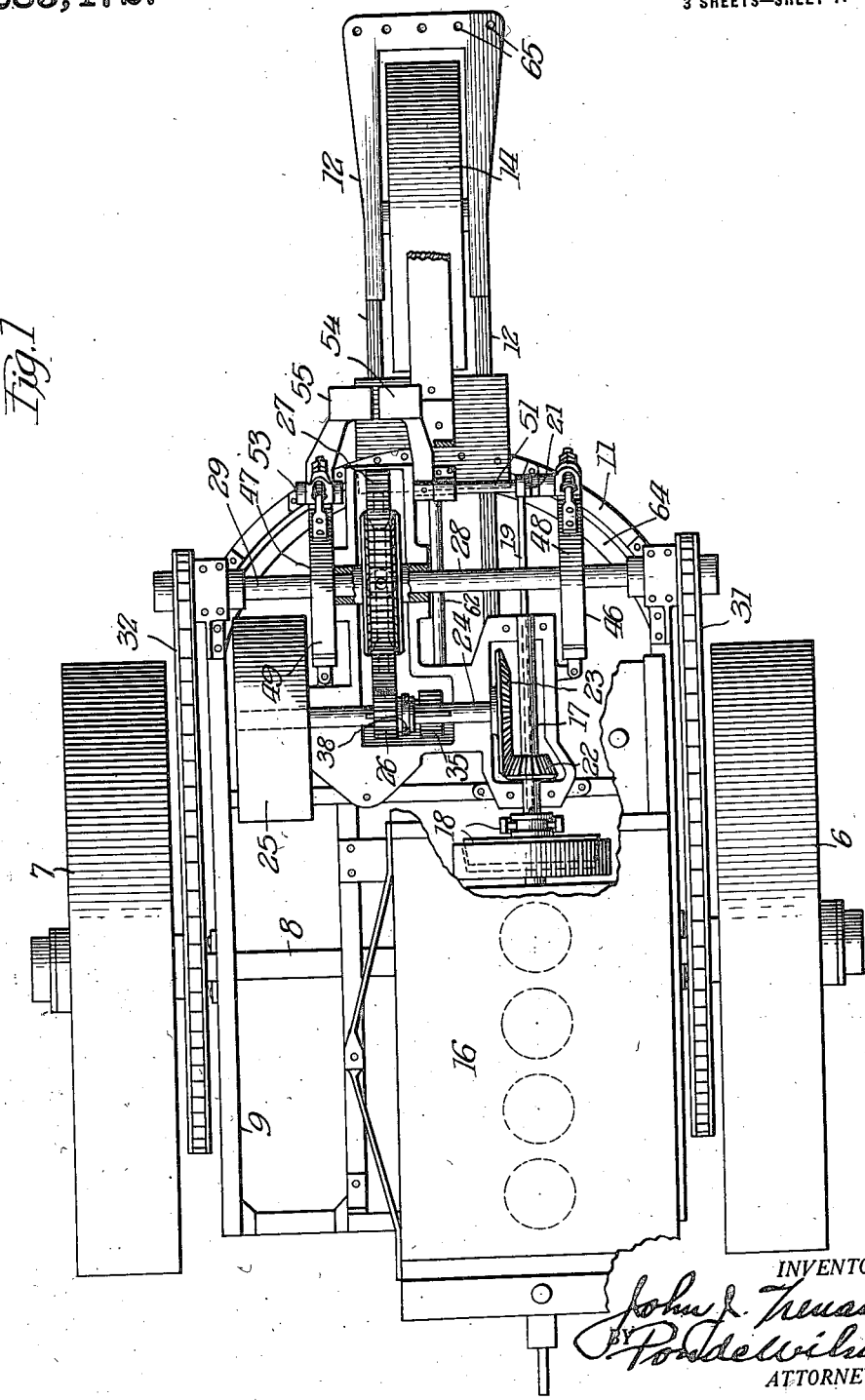

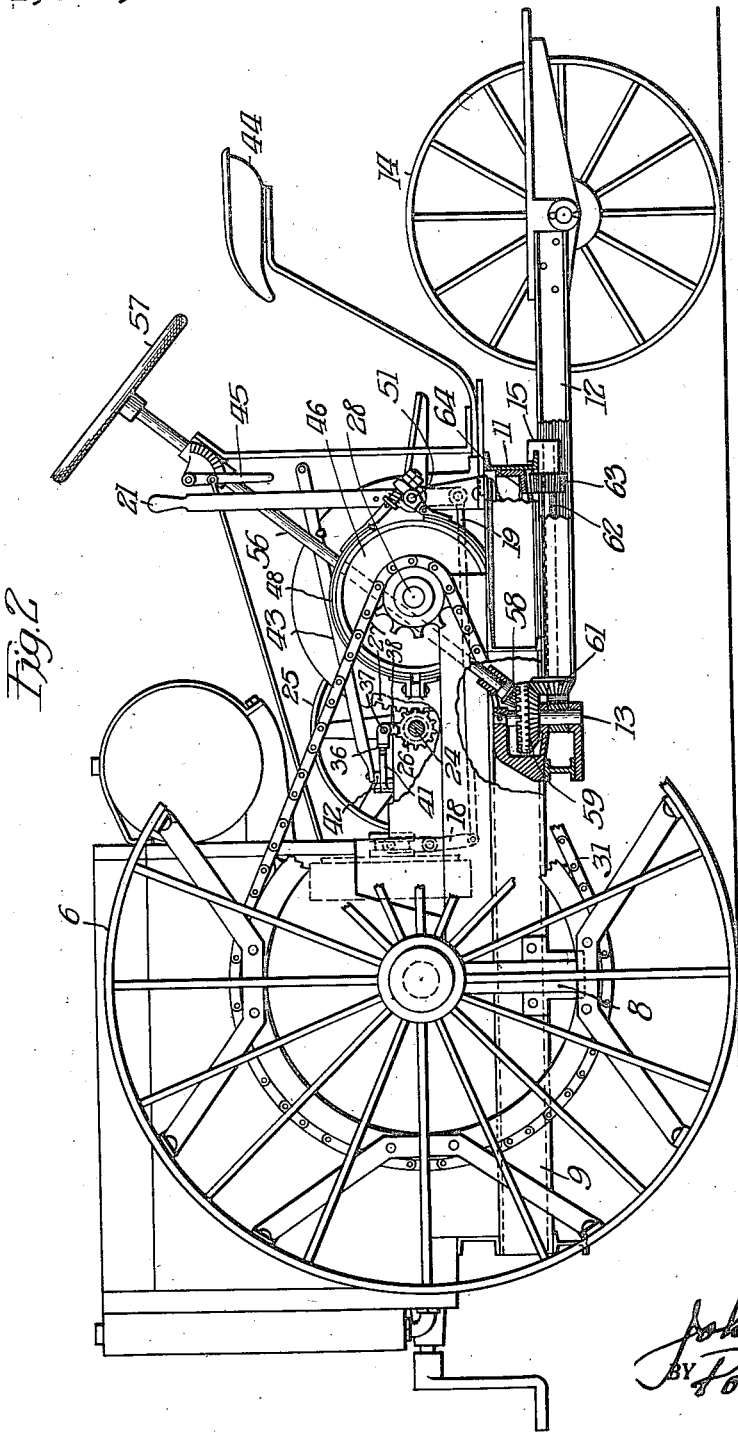

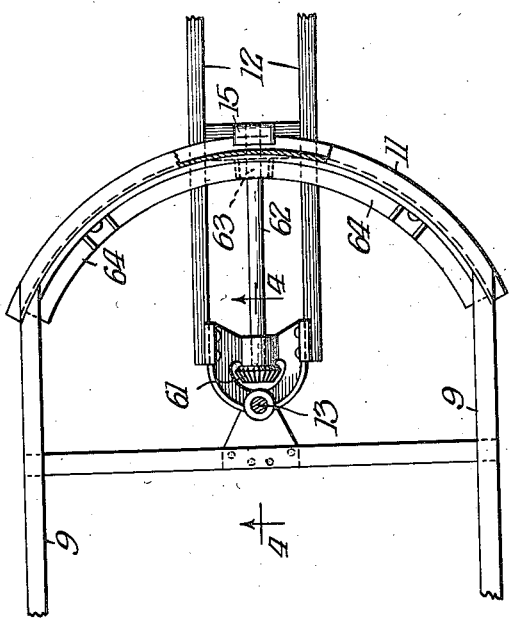
J. J. TRENAM.
TRACTOR.
APPLICATION FILED JUNE 23, 1917.
1,285,472.
Patented Nov. 19, 1918.
3 SHEETS—SHEET 3.

JOHN J. TRENAM, OF MILWAUKEE, WISCONSIN, ASSIGNOR TO TRENAM TRACTOR COMPANY, OF MILWAUKEE, WISCONSIN, A CORPORATION OF SOUTH DAKOTA.

TRACTOR.

1,285,472.            Specification of Letters Patent.       Patented Nov. 19, 1918.

Application filed June 23, 1917. Serial No. 176,467.

*To all whom it may concern:*

Be it known that I, JOHN J. TRENAM, a citizen of the United States, residing at Milwaukee, in the county of Milwaukee and State of Wisconsin, have invented certain new and useful Improvements in Tractors, of which the following is a specification.

This invention relates to tractors, and has more particular reference to that type of tractor which employs two forward traction wheels which carry the greater part of the weight of the tractor.

One of the objects of my present invention is to provide a tractor in which the weight will be so disposed as to give a maximum tractive effort to the machine and which, because of the arrangement and manner of control of the various parts, will be extremely simple in construction and easy to operate and will be capable of turning in a minimum amount of space.

Another feature of my invention resides in the fact that the driver's seat and the various controlling mechanisms operable therefrom always maintain a fixed relation with respect to the driving wheels, so that the driver always has an unobstructed view directly ahead of the traction wheels, no matter in what direction they may be traveling.

A further feature of my invention is the provision of a trailing frame which extends rearwardly of the main frame of the machine and partially supports the weight of the main frame in combination with novel steering mechanism which can be easily manipulated to cause a relative lateral movement between the trailing frame and the rear end of the tractor frame so as to vary the direction of travel of the machine as may be desired.

Another object of my invention is to provide foot-controlled means adapted for use in connection with the hand operated steering means for steering the tractor and controlling the speed of travel thereof.

Still another object is the production of a tractor of extreme simplicity and maximum strength and power, and in which all universal joints and operative springs will be entirely eliminated so as to promote the longevity of the machine.

In order that my invention in one of its preferred embodiments may be readily understood I have illustrated the same on the accompanying drawings. Referring to the drawings, Figure 1 is a plan view of a tractor embodying my invention, certain parts being broken away to show the operating mechanisms;

Fig. 2 is a side elevation of the tractor shown in Fig. 1, certain parts being shown in section;

Fig. 3 is a fragmentary horizontal sectional view showing a portion of the steering mechanism;

Fig. 4 is a sectional view on the line 4—4 of Fig. 3; and

Fig. 5 is a fragmentary sectional view of part of the transmission mechanism.

By reference to the drawings it will be observed that the tractor comprises a pair of traction wheels 6 and 7 connected by a rigid drop axle 8 which carries the main frame, designated generally by reference character 9. This frame which is of a suitable rigid construction rests forwardly of its transverse center upon the axle 8 and extends rearwardly beyond the traction wheels, the rear end of the frame consisting of a channel member 11 of arcute form, for a purpose to be later described. A trailing frame 12 underlies the rear portion of the main frame and is pivotally connected to the main frame by a pivot pin 13, about which the frames may swing laterally with respect to each other to change the direction of travel of the machine. A trailing wheel 14 supports the rear end of the trailing frame and a guiding member 15 carried by the trailing frame is shaped to slidingly engage with the curved rear end member 11 of the main frame so as to prevent vertical movement of either frame with respect to the other.

The engine 16 is mounted upon the main frame near the forward end thereof and, as will be evident from Fig. 1, the engine is disposed at one side of the longitudinal center of the machine so that a free space is left between the engine and the traction wheel 7, in which a power belt may operate when the machine is employed as a stationary engine. Power is transmitted from the engine to the shaft 17 through a clutch 18 of usual construction, which may be controlled through the intermediary of a fork 18 and a link 19 from a clutch lever 21 mounted near the rear end of the main frame. From the shaft 17 the power is transmitted through bevel gears 22 and 23 to a transverse shaft 24 upon the outer end of which is mounted the belt pulley 25, this pulley being disposed parallel with the longitudinal axis of the machine and in alinement with the space between the engine and the traction wheel 7. Upon the transverse shaft 24 there is splined a driving pinion 26 adapted to mesh when in one position directly with the gear 27 of a bevel gear differential through which power is transmitted to the counter shafts 28 and 29. From these counter shafts the traction wheels are driven through the intermediary of the drive chains 31 and 32 respectively. Through the transmission mechanism and differential, just described, the tractor is driven in a forward direction at a certain speed, dependent upon the speed of the engine.

For reversing purposes the driving pinion 26 is splined upon the shaft 24 so as to be slidable longitudinally thereof, and a counter shaft 33 (Fig. 5) is arranged parallel with the shaft 24 and is provided with a pinion 34 which continually meshes with the gear 27 of the differential and a gear 35 which is adapted to mesh with and be driven by the pinion 26 when the pinion is shifted longitudinally on the shaft 24. By this gear train the direction of rotation of the gear 27 is reversed so that the tractor will be driven backward when occasion requires. The gear 26 may be shifted by any suitable mechanism, but in the present instance I have shown for this purpose a rack 36 mounted to slide upon a rod 37 and provided with a forked member 38 which engages with a groove 39 in the hub of the gear 26. This rack 36 is moved longitudinally by means of a segmental rack 41 (Fig. 2) pivoted at 42 and connected at one side of the pivot with an operating link or member 43 which is disposed in accessible position. When this link is moved longitudinally to the limit of its movement in one direction the pinion 26 is thrown directly into mesh with the differential gear 27. When it is shifted to the limit of its movement in the opposite direction it meshes with the gear 35, and when disposed in intermediate position between the gears 27 and 35 the transmission is in neutral so that the engine may run without imparting motion to the traction wheels. The transmission mechanism and differential are, of course, inclosed in suitable casing rigidly mounted upon the main frame 9 and, as will be evident from Fig. 1, the greater part of the weight of the transmission and differential mechanism is disposed on the opposite side of the longitudinal median line of the machine from the engine 16, so that substantially equal proportions of the weight of the machine are carried by each of the traction wheels.

Upon the rear end of the main frame 9 there is mounted the driver's seat 44 from which the clutch lever 21, the gear shift member 43 and the throttle lever 45 are all readily accessible. For the purpose of controlling the speed of the traction wheels with respect to each other the counter shafts 28 and 29 are provided with brake drums 46 and 47 respectively, surrounded by brake bands 48 and 49 which are actuated from rock shafts 51 and 53 mounted upon the main frame and equipped with foot pedals 54 and 55 located conveniently to the feet of the driver. By pressing downwardly upon both of these pedals the brakes are applied so as to stop or hold the machine but by pressing upon one or the other of the pedals one brake is applied with any degree of force so as to retard or practically stop the rotation of the desired one of the traction wheels. When this is done all of the power will, of course, be applied to the other traction wheel, with the result that the machine will turn in the direction of the slower moving wheel.

While the brake mechanism just described may be employed alone, if desired, for steering the tractor, I have provided a manually operable steering mechanism which will be customarily used although the brake mechanism may also be used in conjunction therewith. The steering mechanism, best shown in Figs. 2, 3 and 4, comprises a steering post 56 mounted in an inclined position upon the rearward portion of the main frame and equipped at its upper end with a steering wheel 57, conveniently located with respect to the seat, and provided at its lower end with a bevel pinion 58. Upon the pivot pin 13 about which the trailing frame pivots there is mounted a double bevel gear 59, the upper face of which meshes with the pinion 58 and the lower face with a bevel gear 61 mounted upon the forward end of a shaft 62 carried by the trailing frame. This shaft is also provided with a gear 63 which meshes with a curved rack 64 securely bolted to the rear frame member 11. It will be obvious that when the steering wheel 57 is manipulated movement will be transmitted through the bevel gears, the shaft 62 and the gear 63, to the rear end of the main frame so that relative lateral movement is produced between the rear end of the main frame and the trailing frame, with the result that the main frame and the traction wheels are turned in the desired direction about the pivot pin as a center. In this connection it should be manifest that the rack 64 is formed on an arc concentric with the pivot pin 13. The rear end of the trailing frame serves as the draft-bar to which the implement or load to be drawn is attached, and for convenience the rear end of this frame is provided with a series of draw-bar apertures 65 to which connection may be made by means of a connecting pin or bolt.

A tractor designed in accordance with my invention carries the major portion of its weight directly upon the traction wheels, only sufficient weight being carried by the trailing wheel 14 to prevent this wheel from skidding and, consequently, permitting the tractor to be steered from the steering wheel even when no load is being drawn. When a load is attached to the trailing frame this frame of course serves as a draw-bar and positively precludes sidewise movement of the trailing wheel and frame. Since practically all of the weight of the machine is carried by the tractor wheels it will be manifest that the maximum tractive effort, of which a machine of a given weight is capable, will be exerted by these wheels. The machine may be easily steered by the steering wheel alone or by means of this wheel in conjunction with the foot-operated brake bands, and by applying one of the brakes so as to stop one traction wheel while the other is permitted to run, the machine may be turned about in a circle having a radius equal to the distance between the two traction wheels. Since the major portion of the weight of the engine and the transmission mechanism is disposed on opposite sides of the longitudinal median line of the machine it will be evident that the weight is evenly distributed, and, furthermore, this arrangement enables the belt pulley to be disposed parallel with the longitudinal axis of the machine and leaves plenty of room for the driving belt between the engine and one of the traction wheels. Furthermore, since the driver's seat and all of the controlling devices are carried by the main frame the driver always maintains a position in direct alinement with the driving wheels so that an unobstructed view in the direction of travel of the machine is always possible.

It is believed that one embodiment of my invention and many of its inherent advantages will be readily understood and appreciated from the foregoing without further description, but it should be manifest that the details of construction are capable of considerable modification and variation without departing from the scope of the invention as set forth in the following claims:

I claim:

1. In a tractor, the combination of a pair of traction wheels, a main frame carried thereby, a motor mounted on said frame, transmission mechanism between said motor and said wheels, a seat carried by the rear end of said frame, a trailing frame pivotally connected to said main frame, a steering wheel mounted on the main frame in proximity to said seat, a shaft carried by said trailing frame, a connection between said shaft and said steering wheel, and a connection between said shaft and said main frame whereby relative lateral movement between said main frame and said trailing frame is effected upon manipulation of said steering wheel.

2. In a tractor, the combination of a pair of traction wheels, a main frame carried thereby, a seat mounted on the rear end of said frame, a trailing frame pivoted to the main frame intermediate the ends of said main frame, a shaft carried by said trailing frame, a rack mounted on the rear end of said main frame, a gear on said shaft meshing with said rack, a steering wheel carried by the main frame, and operative connections between said shaft and said steering wheel whereby rotary movements of said steering wheel will cause a relative lateral movement between said frames.

3. In a tractor, the combination of a main frame, a trailing frame, a pivot pin connecting said frames, a shaft carried by the trailing frame, a rack mounted upon the rear end of the main frame, a gear on said shaft meshing with said rack, a bevel gear on said shaft, a steering post mounted on the main frame, a bevel gear carried by said post, and a double bevel gear mounted concentrically with said pivot pin and affording an operative connection between said bevel gears.

4. In a tractor, the combination of a main frame, a pair of traction wheels, a trailing frame overlapping said main frame and extending rearwardly therefrom, a pivot pin connecting the forward end of said trailing frame with said main frame, means slidably connecting the rear end of said main frame with said trailing frame, a gear mounted concentrically with said pivot pin, a steering wheel carried by said main frame and connected with said gear, and means including a shaft carried by said trailing frame for causing a relative lateral movement between said frames upon actuation of said gear.

5. In a tractor, the combination of a main frame, a pair of traction wheels, a trailing frame pivotally connected to the main frame and arranged to support the rear end of said main frame, a seat mounted upon the rear end of the main frame, a steering wheel on the main frame in proximity to the seat, a rack carried by the rear end of the main frame, a gear meshing therewith carried by the trailing frame, and connections between said steering wheel and said gear whereby rotation of said steering wheel will cause a relative lateral movement between said frames.

6. In a tractor, the combination of a main frame, a pair of traction wheels, a trailing frame overlapping said main frame and extending rearwardly therefrom, a pivot pin connecting the forward end of said trailing frame with said main frame, a gear mounted on said pivot pin, a steering post carried by the main frame, a gear on the lower end of said post meshing with said gear on the pivot pin, a horizontally disposed shaft mounted in said trailing frame, a gear on the forward end of said shaft meshing with the gear on said pivot pin, a gear on the rear end of said shaft, and a rack on the rear end of said main frame meshing with said last-mentioned gear whereby rotation of said steering post will cause a relative lateral movement between said main frame and said trailing frame.

JOHN J. TRENAM.